E. H. SCHMIDT.
SHOCK ABSORBING MECHANISM FOR RAILWAY CARS.
APPLICATION FILED FEB. 2, 1915.
1,228,830.
Patented June 5, 1917.
2 SHEETS—SHEET 1.
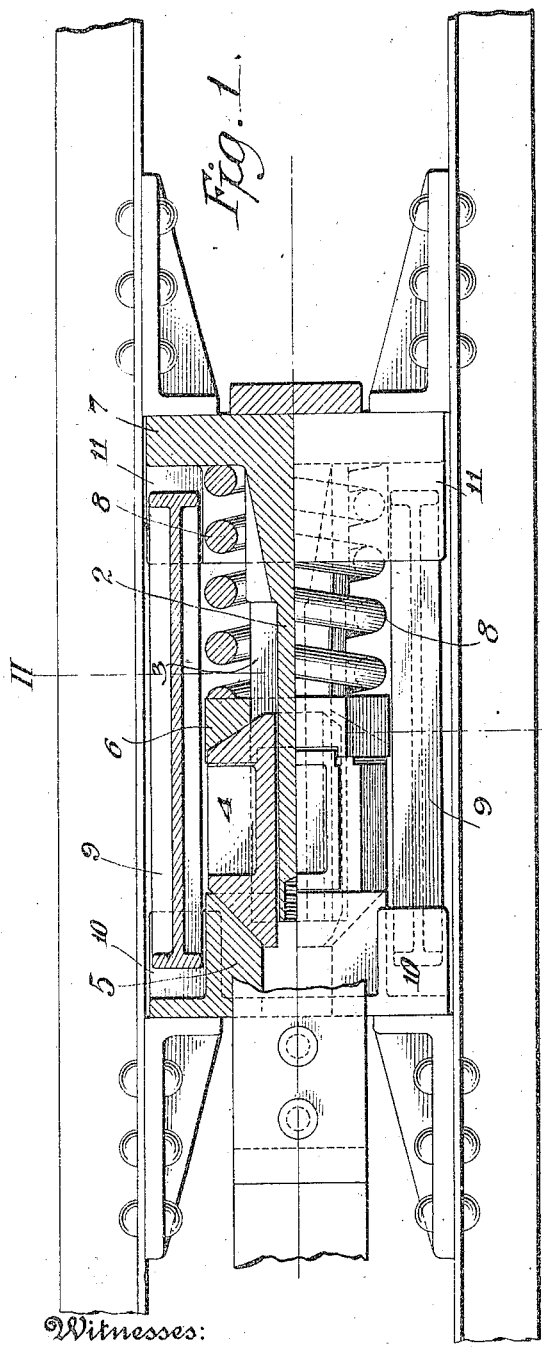
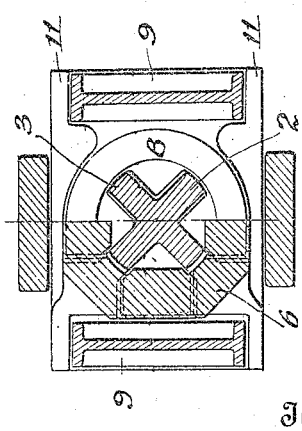

E. H. SCHMIDT.
SHOCK ABSORBING MECHANISM FOR RAILWAY CARS.
APPLICATION FILED FEB. 2, 1915.
1,228,830.
Patented June 5, 1917.
2 SHEETS—SHEET 2.
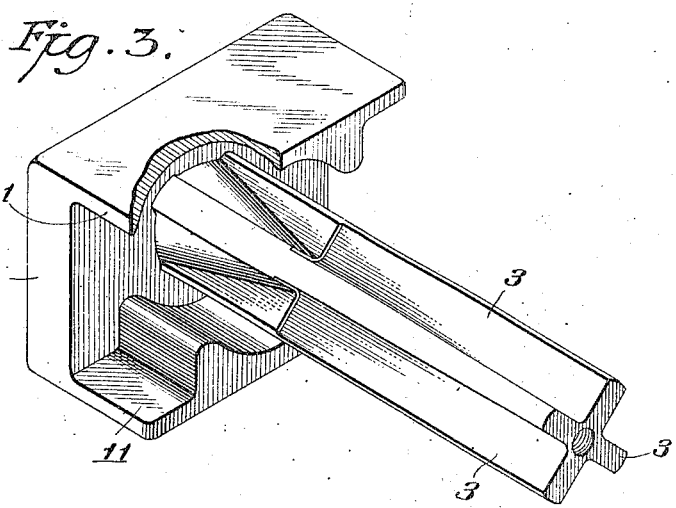
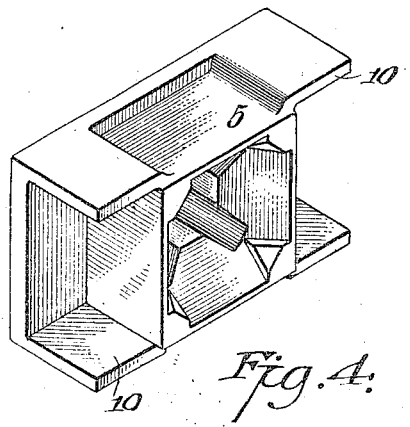
Witnesses:
Raphaël Netter
C. D. Morrill
Inventor
Ernest H. Schmidt
By his Attorney
Clarence D. Kerr

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

SHOCK-ABSORBING MECHANISM FOR RAILWAY-CARS.

1,228,830. Specification of Letters Patent. Patented June 5, 1917.

Application filed February 2, 1915. Serial No. 5,603.

*To all whom it may concern:*

Be it known that I, ERNEST H. SCHMIDT, a citizen of the United States, residing at Cleveland, Cuyahoga county, Ohio, have invented new and useful Improvements in Shock-Absorbing Mechanism for Railway-Cars, of which the following is a specification, reference being had to the accompanying drawings, in which—

Figure 1 is a plan, partly in section, showing an embodiment of my invention applied to the underframing of a car; Fig. 2 is a section on lines II—II of Fig. 1; Fig. 3 is a perspective of the central member, and Fig. 4 is a detail of the outer wedge.

My invention relates to shock absorbing or cushioning mechanism, and is particularly adapted for use on railway cars, which mechanism comprises an included friction member, friction shoes arranged therearound, and wedging members adapted to press the shoes against the included friction member and drive them longitudinally thereof. My invention consists in the construction and coöperation of the parts which I shall hereinafter describe and claim.

Referring to the drawings, 2 indicates the included or central friction member, preferably having a plurality of longitudinally-extending circumferentially and radially disposed webs 3, between each adjacent pair of which is mounted a friction shoe 4, which is held in position by a pair of wedges 5 and 6, faces of which engage corresponding faces on each friction shoe. The included member 2 has an enlargement or base 7 at its rear end to form a bearing against the draft sill stops, as well as providing a bearing for a spring 8 and for a plurality of longitudinally-extending spacing or compression stops 9. The stops 9, which are for the purpose of taking up strains at the end of the compressive movement of the gear, are preferably of I-section, and their ends seat between the flanges 10 and 11 of the outer wedge 5 and the base 7 respectively.

The length of the stops is so proportioned that their ends will strike the base 7 and the wedge 5 just before the spring 8 goes solid. The stops are free to move longitudinally when the rigging is in normal position, and are held from transverse movement by the draft sills.

The terms and expressions which I have employed are used as terms of description and not of limitation, and I have no intention, in the use of such terms and expressions, of excluding any equivalents of the features shown and described, or portions thereof, but recognize that various structural modifications are possible within the scope of the invention claimed.

What I claim is:

1. In frictional shock absorbing mechanism, a central friction member having a plurality of friction faces, a plurality of friction shoes engaging said friction faces, a wedge adapted to compress the friction shoes against the friction faces on the central member, a compression spring, the central friction member having a base portion, and longitudinally-extending stops formed separately from the base portion and the wedge and seating in recesses thereof, the said stops engaging said base portion and said wedge, to limit the compression of the device.

2. In frictional shock absorbing mechanism, a friction member having a plurality of outwardly-radiating arms forming with each other reëntrant angles, a plurality of friction shoes, each seating in a reëntrant angle, an integral wedge engaging said shoes, and a plurality of floating stops engaging a wedge and a portion of the friction member to limit the compression of the device.

ERNEST H. SCHMIDT.

Witnesses:
HARRY E. ORR,
HUBERT L. SPENCE.